(12) United States Patent
Chiang et al.

(10) Patent No.: US 10,137,933 B2
(45) Date of Patent: Nov. 27, 2018

(54) LOAD MANAGEMENT ASSEMBLY

(71) Applicant: GM GLOBAL TECHNOLOGY OPERATIONS LLC, Detroit, MI (US)

(72) Inventors: Huai-yang Chiang, Troy, MI (US); Vikas V. Joshi, Rochester Hills, MI (US); Gheorghe Barbuta, Sterling Heights, MI (US); Hari Prasada Reddy Lingala, Macomb, MI (US); Frank Burger, Ortonville, MI (US); Len V. Peschansky, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 193 days.

(21) Appl. No.: 15/217,181

(22) Filed: Jul. 22, 2016

(65) Prior Publication Data
US 2017/0217497 A1   Aug. 3, 2017

Related U.S. Application Data

(60) Provisional application No. 62/289,505, filed on Feb. 1, 2016.

(51) Int. Cl.
*B62D 21/15* (2006.01)
*B60R 19/02* (2006.01)
*B62D 25/08* (2006.01)

(52) U.S. Cl.
CPC .......... *B62D 21/152* (2013.01); *B60R 19/023* (2013.01); *B62D 25/082* (2013.01)

(58) Field of Classification Search
CPC .... B62D 21/152; B62D 25/082; B60R 19/023
See application file for complete search history.

(56) References Cited

U.S. PATENT DOCUMENTS

| | | | |
|---|---|---|---|
| 8,398,153 B1 * | 3/2013 | Dandekar | B62D 21/152 296/187.09 |
| 9,956,991 B1 * | 5/2018 | Nishikawa | B62D 21/152 |
| 2001/0041123 A1 * | 11/2001 | Baumann | B62D 21/04 414/296 |
| 2010/0096888 A1 * | 4/2010 | Cox | B62D 25/082 296/204 |
| 2014/0091595 A1 * | 4/2014 | Ramoutar | B60R 19/24 296/187.09 |

(Continued)

FOREIGN PATENT DOCUMENTS

JP   6020530 B2 * 11/2016

*Primary Examiner* — Karen Beck
(74) *Attorney, Agent, or Firm* — Quinn IP Law

(57) ABSTRACT

A load management assembly can manage and/or absorb the energy from an external force applied to a vehicle. The load management assembly includes a frame rail and a mounting bracket coupled to the frame rail. In addition, the load management assembly includes a shield coupled to the frame rail. The shield partly surrounds the mounting bracket in order to protect the mounting bracket from an external force and to redirect a load path of the external force. The load management assembly may further include a reinforcement bracket to assist in directing the load path of the external force. The reinforcement bracket is coupled to the frame rail and may be in contact with the mounting bracket.

15 Claims, 4 Drawing Sheets

(56) References Cited

U.S. PATENT DOCUMENTS

| | | | |
|---|---|---|---|
| 2015/0021935 A1* | 1/2015 | Baccouche | B62D 21/152 293/114 |
| 2015/0130224 A1* | 5/2015 | Donabedian | B62D 25/04 296/198 |
| 2015/0246690 A1* | 9/2015 | Matsumoto | B62D 21/152 296/187.1 |
| 2015/0321700 A1* | 11/2015 | Onoda | B62D 27/02 296/187.09 |
| 2017/0106821 A1* | 4/2017 | Gupta | B62D 33/077 |
| 2017/0197661 A1* | 7/2017 | Nakamoto | B62D 25/08 |

* cited by examiner in FIG. 1.

LOAD MANAGEMENT ASSEMBLY

CROSS-REFERENCE TO RELATED APPLICATION

This application claims priority, and the benefit of, U.S. Provisional Patent Application No. 62/289,505, filed on Feb. 1, 2016, the entire disclosure of which is incorporated by reference herein.

TECHNICAL FIELD

The present disclosure relates to a load management assembly for managing and/or absorbing energy originating from an external force applied to a vehicle body.

BACKGROUND

Vehicles may sometimes be subjected to external forces. If an external force is exerted on the vehicle, some vehicle components may manage and/or absorb the energy of that external force.

SUMMARY

The present disclosure relates to a load management assembly for managing and/or absorbing the energy from an external force applied to a vehicle. The load management assembly can also direct the load path of an external force applied to the vehicle in order to stop the displacement of a vehicle wheel toward the vehicle passenger compartment. For instance, the presently disclosed load management assembly can manage and direct the load path when the vehicle is subjected to a frontal, laterally offset external force. In the present disclosure, the term "front, laterally offset external force" means an external force applied to the front of the vehicle at a location that is laterally offset from the vehicle central axis by a lateral distance. In some embodiments, the load management assembly includes a frame rail and a mounting bracket coupled to the frame rail. In addition, the load management assembly includes a shield coupled to the frame rail. The shield partly surrounds the mounting bracket in order to protect the mounting bracket from an external force and to redirect the load path of the external force away from the passenger compartment. The load management assembly may further include a reinforcement bracket to assist in directing the load path of the external force away from the passenger compartment. The reinforcement bracket is coupled to the frame rail and may be in contact with the mounting bracket. The present disclosure also relates to vehicles including the presently disclosed load management assembly.

The above features and advantages and other features and advantages of the present teachings are readily apparent from the following detailed description of the best modes for carrying out the teachings when taken in connection with the accompanying drawings.

DETAILED DESCRIPTION

Figure 1:
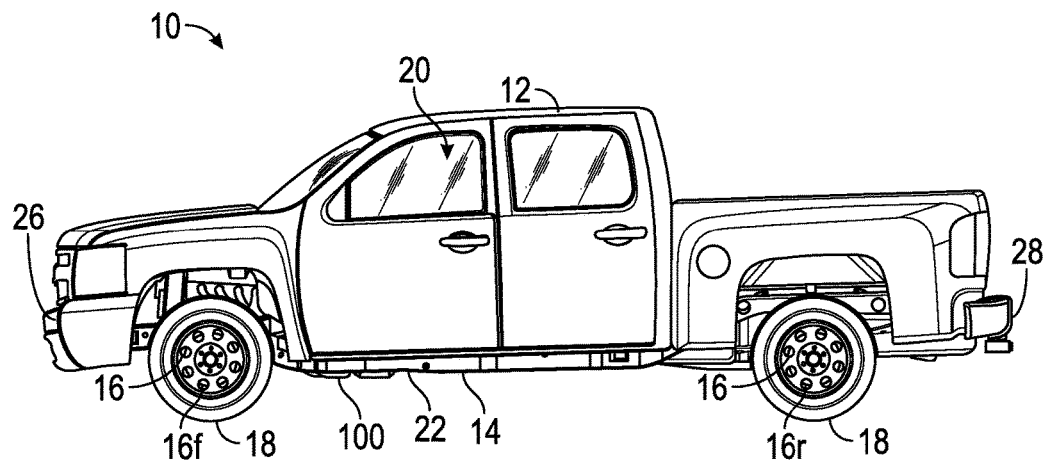
FIG. 1 is a schematic side view of a vehicle including a load management assembly.
Figure 2:
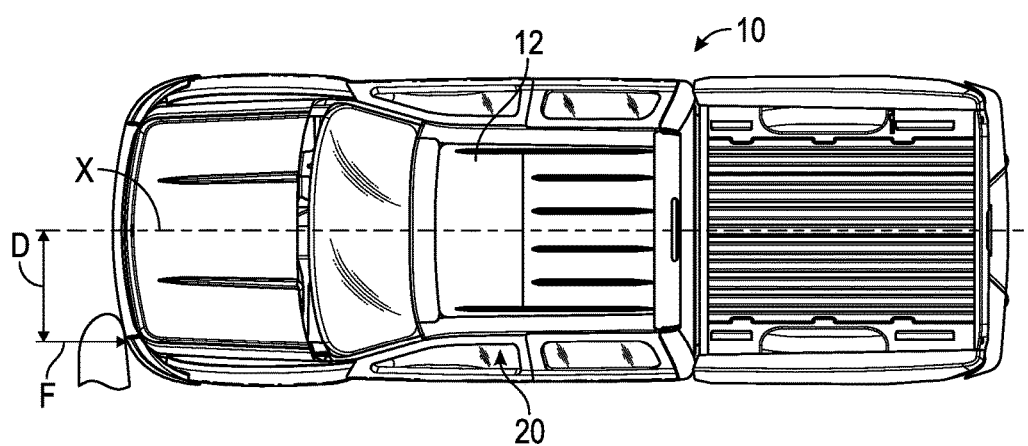
FIG. 2 is a schematic top view of the vehicle shown in FIG. 1.
Figure 3:
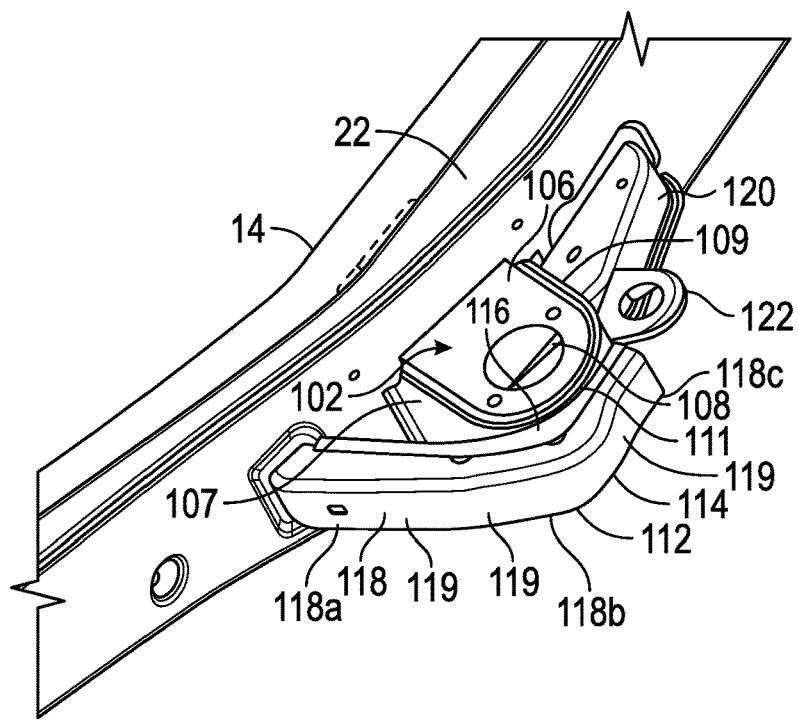
FIG. 3 is a schematic, fragmentary, perspective top view of the load management assembly of the vehicle shown in FIG. 1.
Figure 4:
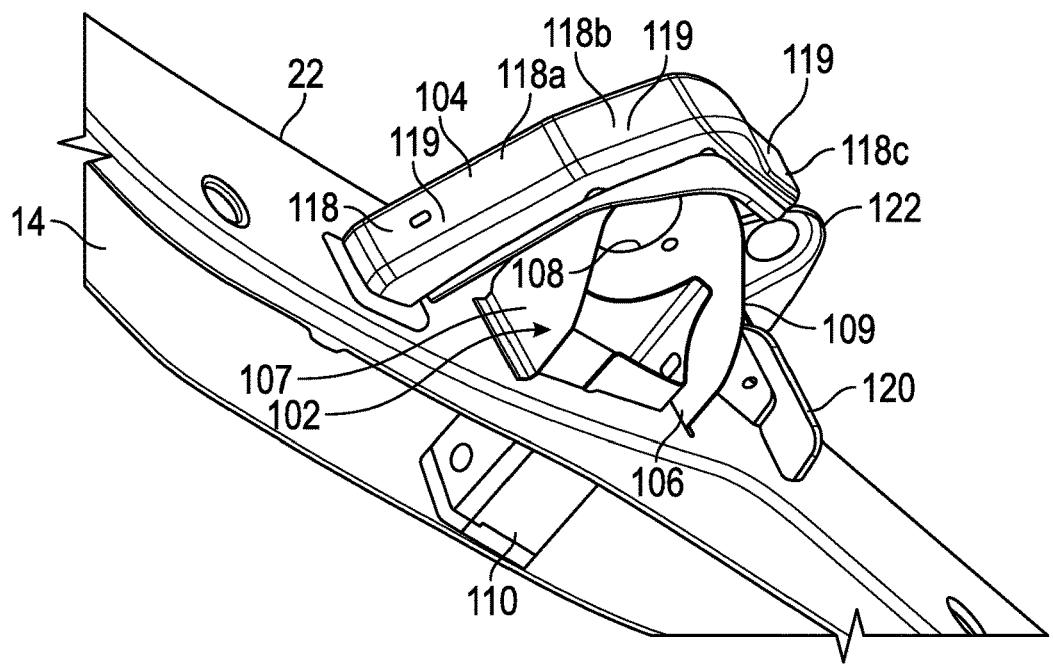
FIG. 4 is a schematic, fragmentary, perspective bottom view of the load management assembly of the vehicle shown in FIG. 1.
Figure 5:
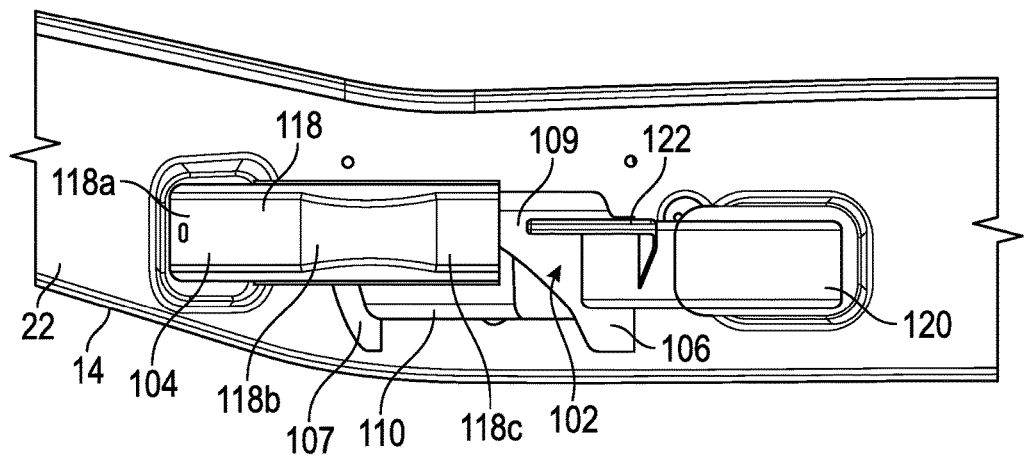
FIG. 5 is a schematic, fragmentary, side view of the load management assembly of the vehicle shown in FIG. 1.

Referring to the drawings, wherein like reference numbers correspond to like or similar components throughout the several figures, and beginning with FIGS. 1 and 2, a vehicle 10 includes a vehicle body 12, a frame 14 supporting the vehicle body 12, and a plurality of wheels 16 operatively coupled to the vehicle body 12. Each wheel 16 is coupled to a tire 18. In the depicted embodiment, the vehicle 10 includes two front wheels 16f and two rear wheels 16r. Although the drawings depict a truck, the vehicle 10 may be any suitable vehicle capable of transporting objects and/or people, such as boats, cars, airplanes, and farm equipment. The vehicle body 12 may be symmetrical along a vehicle central axis X and defines a passenger compartment 20. The passenger compartment 20 is located between the front bumper 26 and the rear bumper 28 of the vehicle body 12 and can accommodate objects and/or vehicle occupants. The frame 14 is made of a substantially rigid material, such as a high strength material. In the present application, the term "frame" means bridge-like structural load-carrying members of a vehicle that support the engine and/or vehicle body and are in turn supported by the wheels of the vehicle. The frame 14 includes at least one frame rail 22 extending axially along the vehicle central axis X.

The vehicle 10 includes a load management assembly 100 (FIG. 1) coupled to the frame rail 22. As discussed in detail below, the load management assembly 100 can manage and direct the load path P (FIG. 6) when the vehicle 10 is subjected to a frontal, laterally offset external force F. In the present disclosure, the term "front, laterally offset external force" means an external force applied to the front of the vehicle 10 at a location that is laterally offset from the vehicle central axis X by a lateral distance D. The vehicle 10 can be subjected to the external force F, for example, when the front bumper 26 of the vehicle body 12 contacts a barrier B while the vehicle 10 is in motion. When the vehicle 10 contacts the barrier B, the load management assembly 100 can manage the load path P (FIG. 6) of the external force F in order to prevent the wheel 16 from being displaced into the passenger compartment 20. In other words, the load management assembly 100 can stop the inward displacement of the wheel 16 (e.g., the front wheel 16f) toward the passenger compartment 20, when the vehicle body 12 is subjected to the external force F, in order to prevent the wheel 16 from entering the passenger compartment 20. The load management assembly 100 can be directly coupled to the frame rail 22 at a location adjacent the wheel 16 (i.e., behind the front wheel 16f). As such, the wheel 16 can contact the load management assembly 100 when the vehicle body 12 is subjected to the external force F, thereby enabling the load management assembly 100 to manage the load path P (FIG. 6) of the external force F.

With reference to FIGS. 3-6, the load management assembly 100 includes a mount 102 directly coupled to the frame rail 22. The mount 102 can couple the frame 14 to the vehicle body 12. To this end, the mount 102 can be coupled to a boss 104 (FIG. 7), which couples the frame 14 to the vehicle body 12. The mount 102 includes a mounting bracket 106 for coupling the boss 104 to the frame rail 22. In the depicted embodiment, the mounting bracket 106 protrudes from the frame rail 22 away from the vehicle central axis X (FIG. 2) and defines a hole 108 configured, shaped, and sized to receive the boss 104. The mounting bracket 106 has a first or front wall 107 directly coupled to the frame rail 22, a second or rear wall 109 opposite the first wall 107, and a third or intermediate wall 111 directly interconnecting the first wall 107 and the second wall 109. The second wall 109 is directly coupled to the frame rail 22. The third wall 111 may have a convex shape and is disposed between the first wall 107 and the second wall 109.

Aside from the mounting bracket 106, the mount 102 includes a bulkhead 110 extending at least partially through the frame rail 22 in order to support the mounting bracket 106. Accordingly, the bulkhead 110 is coupled to the frame rail 22 and the mounting bracket 106. As a non-limiting example, the mounting bracket 106 and the bulkhead 110 may be welded to the frame rail 22. The bulkhead 110 may be made of multiple pieces welded together.

In addition to the mount 102, the load management assembly 100 includes a shield 112 at least partially surrounding the mounting bracket 106 in order to protect the mounting bracket 106 from the external force F and manage the load path P (FIG. 6) of the external force F. The shield 112 is made of a substantially rigid material, such as steel, and is disposed in front of the mounting bracket 106. Therefore, the shield 112 can direct the load path P of the external force F when the vehicle body 12 is subjected to the external force F (FIG. 2). The shield 112 can be directly coupled to the frame rail 22. For instance, the shield 112 can be welded to the frame rail 22. In the depicted embodiment, the shield 112 includes an outer shield portion 114 and an inner shield portion 116 coupled to the outer shield portion 114 in order to minimize cost and weight. As a non-limiting example, the outer shield portion 114 may be welded to the inner shield portion 116. It is envisioned that the shield 112 may be made as an integral one-piece structure. Regardless, the shield 112 includes a plurality of interconnected bar portions 118 that are angularly offset relative to one another in order to at least partially surround the mounting bracket 106.

As a non-limiting example, the shield 112 includes three bar portions 118 (i.e., the first bar portion 118a, the second bar portion 118b, and the third bar portion 118c interconnected to one another). The second bar portion 118b is coupled between the first bar portion 118a and the third bar portion 118c and is obliquely angled relative to the first bar portion 118a and the third bar portion 118c in order to partially surround the mounting bracket 106. The first bar portion 118a is directly coupled to the frame rail 22 and is obliquely angled relative to the second bar portion 118b, thereby enabling the shield 112 to be firmly fixed to the frame rail 22 while partially surrounding the mounting bracket 106. Specifically, the first bar portion 118a is disposed along the first wall 107 of the mounting bracket 106 to protect the mounting bracket 106 from the external force F (FIG. 1). In the depicted embodiment, the first bar portion 118a is obliquely angled relative to (and spaced apart and in front of) the first wall 107 of the mounting bracket 106 in order to protect the mounting bracket 106 from the external force F (FIG. 1). The second bar portion 118b is obliquely angled relative to the first bar portion 118a and the third bar portion 118c in order to be positioned to engage the wheel 16 (e.g., the front wheel 16f) when the vehicle body 12 is subjected to the external force F. To this end, the second bar portion 118b is disposed along (and in front of) the third wall 111 of the mounting bracket 106. The third bar portion 118c may be obliquely angled relative to the second bar portion 118b in order to partially surround the mounting bracket 106. As such, the third bar portion 118c is disposed along the third wall 111 of the mounting bracket 106 in order to protect the mounting bracket 106 when the vehicle body 12 is subjected to the external force F.

Each bar portion 118 has at least one outer flat surface 119 for engaging the wheel 16 when the external force F is applied to the vehicle body 12. In some embodiments, only some bar portions 118 include the flat surfaces 119. The flat surfaces 119 of the bar portions 118 allow the shield 112 to redirect the load path P of the external force F away from the passenger compartment 20. Moreover, the shield 112 is disposed between the wheel 16 (e.g., the front wheel) and the mounting bracket 106, thereby allowing the shield 112 to protect the mounting bracket 106 from the wheel 16 when the vehicle body 12 is subjected to the external force F.

Figure 6:
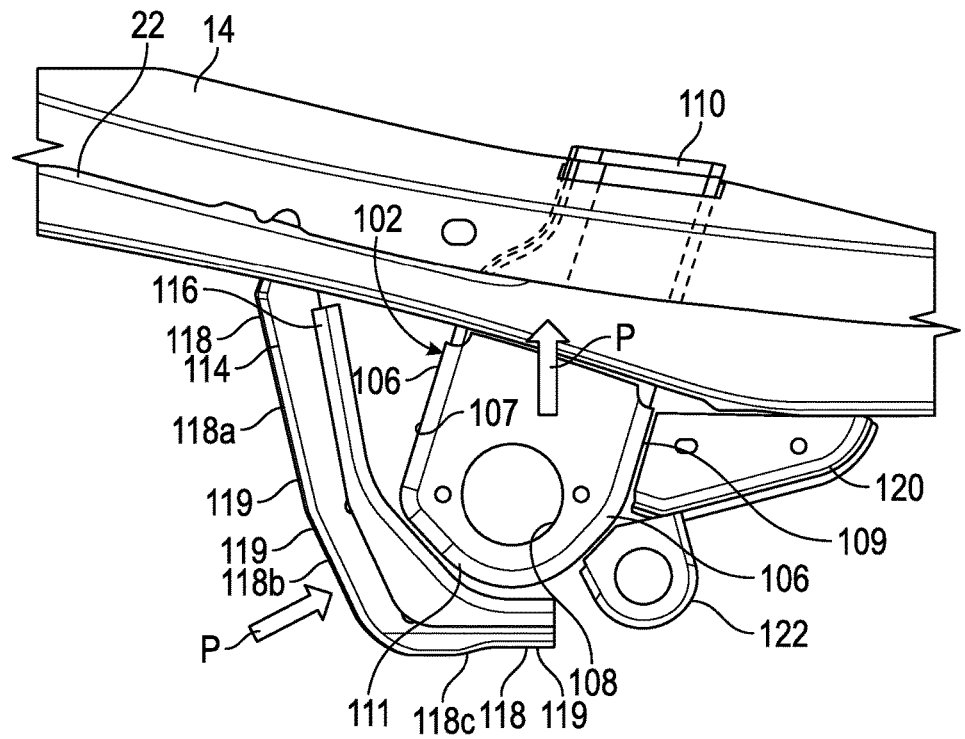
FIG. 6 is a schematic, fragmentary, top view of the load management assembly of the vehicle shown in FIG. 1.

With reference to FIG. 6, the load management assembly 100 further includes a reinforcement bracket 120 coupled to the frame rail 22 behind the mounting bracket 106. As such, the reinforcement bracket 120 can react to the forces exerted on the mounting bracket 106 and redirect the load path P of the external force F toward the frame rail 22. To this end, the reinforcement bracket 120 can be in direct contact with the mounting bracket 106. Specifically, the reinforcement bracket 120 can be in direct contact with the second wall 109 of the mounting bracket 106. Further, the mounting bracket 106 is disposed between the reinforcement bracket 120 and the shield 112 in order to redirect the load path P of the external force F toward the frame rail 22 and away from the passenger compartment 20. The reinforcement bracket 120 is made of a substantially rigid material, such as a rigid metal, and may include a locating feature 122 for facilitating assembly. In the depicted embodiment, the locating feature 122 is configured as a loop.

Figure 7:
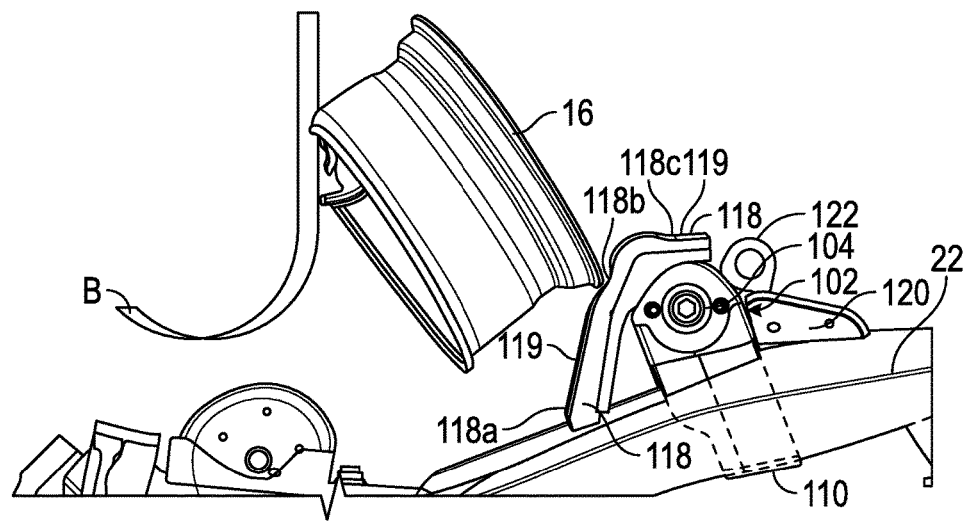
FIG. 7 is a schematic, fragmentary, top view of the frame, the wheel, and the load management assembly of the vehicle shown in FIG. 1.
Figure 8:
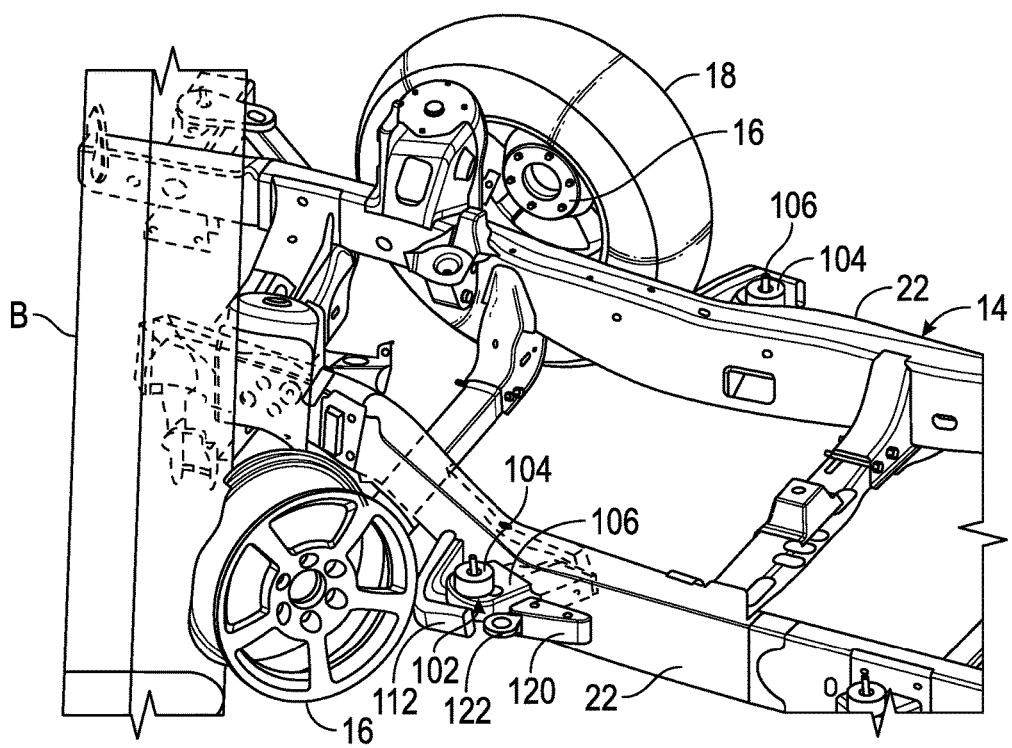
FIG. 8 is a schematic, fragmentary, perspective view of the frame, the wheels, and the load management assembly of the vehicle shown in FIG. 1.

Referring to FIGS. 2, 7 and 8, when the external force F is applied to the vehicle body 12 (such as when the vehicle body 12 contacts the barrier B), the wheel 16 (i.e., the front wheel 16f) tends to move inwardly toward the passenger compartment 20. To inhibit this inward movement of the wheel 16, the load management assembly 100 redirects the load path P of the external force F toward the frame rail 22 and away from the passenger compartment 20. Specifically, when the external force F is applied to the vehicle body 12, the wheel 16 moves toward the shield 112 and eventually engages (i.e., contacts) the shield 112. At this juncture, the shield 112 protects the mounting bracket 106 and the flat surfaces 119 of the shield 112 cause the load path P of the external force F to be redirected toward the frame rail 22 and away from the passenger compartment 20. When the external force F is applied to the vehicle body 12, the reinforcement bracket 120 reacts to the external force F transmitted through the mounting bracket 106 and also redirects the load path P toward the frame rail 22 and away from the passenger compartment 20. As a consequence, the wheel 16 is prevented from the moving inwardly toward the passenger compartment 20 of the vehicle body 12.

While the best modes for carrying out the teachings have been described in detail, those familiar with the art to which this disclosure relates will recognize various alternative designs and embodiments for practicing the teachings within the scope of the appended claims.

The invention claimed is:

1. A load management assembly, comprising:
    a frame rail;
    a mounting bracket coupled to the frame rail, wherein the mounting bracket includes a first wall, a second wall opposite the first wall, and a third wall interconnecting the first wall and the second wall; and
    a shield coupled to the frame rail, wherein the shield at least partially surrounds the mounting bracket in order to protect the mounting bracket from an external force and to redirect a load path of the external force;
    a reinforcement bracket coupled to the frame rail, wherein the reinforcement bracket is disposed adjacent the mounting bracket such that the mounting bracket is disposed between the reinforcement bracket and the shield;
    a bulkhead coupled to the frame rail and the mounting bracket, wherein the bulkhead extends through the frame rail; and
    wherein the reinforcement bracket is in contact with the third wall of the mounting bracket.

2. The load management assembly of claim 1, wherein the shield includes a plurality of interconnected bar portions.

3. The load management assembly of claim 2, wherein the bar portions are obliquely angled relative to each other.

4. The load management assembly of claim 3, wherein at least one of the bar portions includes at least one flat surface.

5. The load management assembly of claim 4, wherein the bar portions include a first bar portion, a second bar portion, and a third bar portion coupled between the first bar portion and the second bar portion, and the first bar portion is obliquely angled relative to the first wall.

6. The load management assembly of claim 5, wherein the first bar portion is disposed adjacent the first wall of the mounting bracket in order to protect the first wall.

7. The load management assembly of claim 6, wherein the second bar portion and the third bar portion are disposed adjacent the third wall of the mounting bracket in order to protect the third wall of the mounting bracket.

8. A load management assembly, comprising:
    a frame rail;
    a mounting bracket coupled to the frame rail;
    a shield coupled to the frame rail, wherein the shield at least partially surrounds the mounting bracket in order to protect the mounting bracket from an external force and to redirect a load path of the external force;
    wherein the shield includes a plurality of interconnected bar portions;
    wherein the bar portions are obliquely angled relative to each other;
    wherein at least one of the bar portions includes at least one flat surface;
    wherein the mounting bracket includes a first wall, a second wall opposite the first wall, and a third wall interconnecting the first wall and the second wall, the bar portions include a first bar portion, a second bar portion, and a third bar portion coupled between the first bar portion and the second bar portion, and the first bar portion is obliquely angled relative to the first wall;
    wherein the first bar portion is disposed adjacent the first wall of the mounting bracket in order to protect the first wall;
    wherein the second bar portion and the third bar portion are disposed adjacent the third wall of the mounting bracket in order to protect the third wall of the mounting bracket;
    wherein the load management assembly further includes a bulkhead coupled to the frame rail and the mounting bracket;
    wherein the bulkhead extends through the frame rail;
    wherein the load management assembly further includes a reinforcement bracket coupled to the frame rail;
    wherein the reinforcement bracket is disposed adjacent the mounting bracket such that the mounting bracket is disposed between the reinforcement bracket and the shield; and
    wherein the reinforcement bracket is in contact with the third wall of the mounting bracket.

9. A vehicle, comprising:
    a vehicle body defining a passenger compartment;
    a frame supporting the vehicle body, wherein the frame includes a frame rail;
    a wheel coupled to the vehicle body;
    a mounting bracket coupled to the frame rail, wherein the mounting bracket includes a first wall, a second wall opposite the first wall, and a third wall interconnecting the first wall and the second wall;
    a shield coupled to the frame rail, wherein the shield is disposed between the wheel and the mounting bracket, and the shield at least partially surrounds the mounting bracket in order to prevent the wheel from moving toward the passenger compartment when an external force is applied to the vehicle body;
    a reinforcement bracket coupled to the frame rail, wherein the reinforcement bracket is disposed adjacent the mounting bracket such that the mounting bracket is disposed between the reinforcement bracket and the shield;
    a bulkhead coupled to the frame rail and the mounting bracket, wherein the bulkhead extends through the frame rail; and
    wherein the reinforcement bracket is in contact with the third wall of the mounting bracket.

10. The vehicle of claim 9, wherein the shield includes a plurality of interconnected bar portions.

11. The vehicle of claim 10, wherein the bar portions are obliquely angled relative to each other.

12. The vehicle of claim 11, wherein at least one of the bar portions includes at least one flat surface.

13. The vehicle of claim 12, wherein the bar portions include a first bar portion, a second bar portion, and a third bar portion coupled between the first bar portion and the second bar portion, and the first bar portion is obliquely angled relative to the first wall.

14. The vehicle of claim 13, wherein the first bar portion is disposed adjacent the first wall of the mounting bracket in order to protect the first wall.

15. The vehicle of claim 14, wherein the second bar portion and the third bar portion are disposed adjacent the third wall of the mounting bracket in order to protect the third wall of the mounting bracket.

* * * * *